(12) United States Patent
Koike et al.

(10) Patent No.: US 9,937,779 B2
(45) Date of Patent: Apr. 10, 2018

(54) VEHICLE

(71) Applicant: KUBOTA CORPORATION, Osaka (JP)

(72) Inventors: Kazuo Koike, Hyogo (JP); Hirokazu Ito, Osaka (JP); Takafumi Komatsu, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/202,462

(22) Filed: Mar. 10, 2014

(65) Prior Publication Data

US 2015/0083506 A1 Mar. 26, 2015

(30) Foreign Application Priority Data

Sep. 25, 2013 (JP) .................... 2013-198606

(51) Int. Cl.
*B60K 1/00* (2006.01)
*B60K 1/02* (2006.01)
(Continued)

(52) U.S. Cl.
CPC ................. *B60K 1/02* (2013.01); *B60K 1/00* (2013.01); *B60K 1/04* (2013.01); *B60K 7/0007* (2013.01);
(Continued)

(58) Field of Classification Search
CPC ... B60K 1/00; B60K 1/02; B60K 1/04; B60K 2001/0405; B60K 2001/0416; B60K 2001/0411; B60K 7/00; B60K 7/0007; B60K 2007/0061; B60K 2007/0076; B60K 17/043; B60K 17/12; B60K 17/14
(Continued)

(56) References Cited

U.S. PATENT DOCUMENTS 4,876,846 A * 10/1989 Torras .................... A01D 34/86
56/11.9
4,964,265 A * 10/1990 Young ............................ 56/10.8
(Continued)

FOREIGN PATENT DOCUMENTS

JP 4-328085 11/1992
JP 5-34820 5/1993
(Continued)

OTHER PUBLICATIONS

Japanese Office Action issued in JP 2013-198606.

*Primary Examiner* — James M Dolak
(74) *Attorney, Agent, or Firm* — Greenblum & Bernstein, P.L.C.

(57) ABSTRACT

Vehicle according to the present invention includes a traveling vehicle body and left and right drive wheels. Left and right propulsion motors drive the left and right drive wheels. A battery supplies electric power to the left and right propulsion motors. The left and right drive wheels are positioned on two width-direction ends of the traveling vehicle body. The left and right propulsion motors are positioned on the traveling vehicle body so as to align with the left and right drive wheels in the width direction of the vehicle body. The battery is positioned in a battery installation space of the traveling vehicle body. The battery installation space is located in at least a space located below the left and right propulsion motors.

23 Claims, 9 Drawing Sheets

(51) Int. Cl.
  *B60K 17/12* (2006.01)
  *B60K 1/04* (2006.01)
  *B60K 7/00* (2006.01)

(52) U.S. Cl.
  CPC ...... *B60K 17/12* (2013.01); *B60K 2001/0405* (2013.01); *B60K 2007/0038* (2013.01); *B60K 2007/0061* (2013.01); *B60K 2007/0092* (2013.01); *B60Y 2200/223* (2013.01)

(58) Field of Classification Search
  USPC ..... 180/65.6, 65.1, 65.51, 6.48, 65.31, 68.1, 180/68.5, 6.5
  See application file for complete search history.

(56) References Cited

U.S. PATENT DOCUMENTS

| | | | | |
|---|---|---|---|---|
| 5,502,957 | A * | 4/1996 | Robertson | A01D 34/6806 56/10.2 G |
| 6,029,762 | A * | 2/2000 | Kepner | 180/65.1 |
| 6,145,855 | A * | 11/2000 | Bellis, Jr. | B62D 49/065 280/32.7 |
| 6,267,190 | B1 * | 7/2001 | Micheletti | 180/183 |
| 6,371,228 | B1 * | 4/2002 | Husted et al. | 180/65.1 |
| 6,497,422 | B1 * | 12/2002 | Bellis, Jr. | B62D 49/065 280/32.7 |
| 6,604,348 | B2 * | 8/2003 | Hunt | 56/10.6 |
| 6,688,089 | B2 * | 2/2004 | Velke et al. | 56/14.7 |
| 7,578,116 | B1 * | 8/2009 | Howell | 56/11.9 |
| 7,610,975 | B1 * | 11/2009 | Gust | A01D 34/44 180/65.245 |
| 7,828,099 | B2 * | 11/2010 | Heckeroth | 180/68.5 |
| 7,975,786 | B2 * | 7/2011 | Ishii | A01D 34/78 180/6.2 |
| 8,091,672 | B2 * | 1/2012 | Gutsch | A01D 34/67 15/340.3 |
| 8,099,936 | B2 * | 1/2012 | Bryant | A01D 34/435 241/194 |
| 8,141,669 | B1 * | 3/2012 | Laymaster | 180/65.6 |
| 8,191,342 | B2 * | 6/2012 | Ishii | A01D 34/44 56/11.9 |
| 8,196,247 | B2 * | 6/2012 | Fellhauer et al. | 15/49.1 |
| 8,240,414 | B2 * | 8/2012 | Sasahara et al. | 180/65.31 |
| 8,267,205 | B2 * | 9/2012 | Ishii | B60K 17/30 180/252 |
| 8,544,570 | B2 * | 10/2013 | Ishii et al. | 180/6.5 |
| 8,572,939 | B2 * | 11/2013 | Koike et al. | 56/10.2 A |
| 8,579,055 | B2 * | 11/2013 | Sasahara | A01D 69/02 180/6.5 |
| 8,668,033 | B2 | 3/2014 | Koike et al. | |
| 8,931,189 | B2 * | 1/2015 | Jones | E02F 3/4075 37/410 |
| 8,983,693 | B2 * | 3/2015 | Yamamura | G05D 1/0225 701/22 |
| 9,161,490 | B2 * | 10/2015 | Melone et al. | |
| 9,288,942 | B2 * | 3/2016 | Moriguchi | A01D 69/02 |
| 9,313,948 | B2 * | 4/2016 | Moriguchi | A01D 34/78 |
| 9,333,130 | B2 * | 5/2016 | Puskar-Pasewicz | A61G 5/042 |
| 9,365,401 | B2 * | 6/2016 | Nakazawa | B60K 1/00 |
| 9,376,298 | B2 * | 6/2016 | Nakazawa | B60K 1/00 |
| 9,550,659 | B2 * | 1/2017 | Nakazawa | B60K 1/00 |
| 9,699,965 | B2 * | 7/2017 | Schygge | B60K 1/04 |
| 2012/0227369 | A1 | 9/2012 | Koike et al. | |

FOREIGN PATENT DOCUMENTS

| | | |
|---|---|---|
| JP | 6-64452 | 3/1994 |
| JP | 2004-166546 | 6/2004 |
| JP | 2011-087482 | 5/2011 |

\* cited by examiner

VEHICLE

CROSS-REFERENCE TO RELATED APPLICATIONS

The present application claims priority under 35 U.S.C. § 119 of Japanese Application No. 2013-198606, filed on Sep. 25, 2013, the disclosure of which is expressly incorporated by reference herein in its entirety.

BACKGROUND OF THE INVENTION

1. Field of the Invention

The present invention relates to a vehicle that includes a traveling vehicle body supported by left and right drive wheels, and left and right propulsion motors driving the left and right drive wheels.

2. Description of Related Art

The vehicle described above is used, for example, in a work vehicle such as a lawn mower and includes a battery to supply electric power to the left and right propulsion motors. By supplying electric power from the battery to the propulsion motors, axles on each of a left and right drive wheel are rotationally driven by the left and right propulsion motors, respectively, and the vehicle travels forward, backward, and the like (see, e.g., the disclosure of U.S. Pat. No. 8,240,414).

In the vehicle disclosed by U.S. Pat. No. 8,240,414, left and right drive wheels are positioned on two width-direction ends of a traveling vehicle body such that each of the left and right drive wheels aligns in the width direction of the vehicle body with each of left and right propulsion motors. An installed position of a battery is located such that the propulsion motors and the battery align in the width direction of the vehicle body. In addition, the installed positions of other batteries are located so as to align on front and back sides of the propulsion motors with the propulsion motors therebetween in a front-back direction of the vehicle body.

In the vehicle disclosed by U.S. Pat. No. 8,240,414, the propulsion motors and the battery are aligned in the width direction of the vehicle body. Therefore, the traveling vehicle body must have a size sufficient to enable the propulsion motor, battery, and propulsion motor to be aligned in that order in the width direction of the vehicle body on both the right and left sides of the width direction of the vehicle body. The traveling vehicle body is thus large in the width direction of the vehicle body.

In addition, when the batteries are positioned so as to align on the front and back sides of the propulsion motors with the propulsion motors therebetween in the front-back direction of the vehicle body, the traveling vehicle body must have a size sufficient to enable the battery, propulsion motor, and battery to be aligned in that order in the front-back direction of the vehicle body. The traveling vehicle body is thus large in the front-back direction of the vehicle body.

Because the propulsion motor is activated by electric power supplied from the battery, a distance and time for which the vehicle can travel on one charge is extended when a capacity of the battery is increased. Therefore, increasing the capacity of the battery is desirable. When the capacity of the battery is increased in order to meet this desire, an installation space for a larger battery must be reserved in the width direction or the front-back direction of the vehicle body and an increasing size of the traveling vehicle body becomes a notable concern in the vehicle according to U.S. Pat. No. 8,240,414.

Thus, a vehicle is desired that is capable of reducing the width-direction and front-back-direction size of the traveling vehicle body while providing left and right propulsion motors and a battery to the traveling vehicle body.

SUMMARY OF THE INVENTION

A non-limiting feature of a vehicle according to the present invention provides a vehicle that includes a traveling vehicle body supported by left and right drive wheels; left and right propulsion motors driving the left and right drive wheels; and a battery supplying electric power to the left and right propulsion motors. The left and right drive wheels are positioned on two width-direction ends of the traveling vehicle body. The left and right propulsion motors are positioned on the traveling vehicle body so as to align with the left and right drive wheels in the width direction of the vehicle body. The battery is positioned in a battery installation space of the traveling vehicle body, the battery installation space being formed at least by a space below the left and right propulsion motors.

According to this feature, when positioning the battery installation space in the traveling vehicle body, at least the space below the left and right propulsion motors is utilized. Therefore, the battery located in the battery installation space is not aligned with the propulsion motors in the width direction and front-back direction of the vehicle body, and a size of the traveling vehicle body can be reduced. Moreover, the left and right propulsion motors are positioned so as to be aligned with the left and right drive wheels, respectively, in the width direction of the vehicle body. Therefore, a space is reserved sufficient for the left and right propulsion motors to be aligned with the left and right drive wheels in the width direction of the vehicle body. Accordingly, by making effective use of the space below the space reserved for positioning the left and right propulsion motors, the left and right propulsion motors and the battery can be positioned efficiently and without creating wasted space in the traveling vehicle body. A traveling vehicle body that is compact in the width direction and the front-back direction can thus be configured.

Another non-limiting feature of the vehicle according to the present invention provides a vehicle in which at least a portion of the battery installation space is positioned below axles of each of the left and right drive wheels.

According to this feature, at least a portion of a large-capacity battery can be positioned in the battery installation space below the axles of each of the left and right drive wheels. Therefore, a center of gravity of the traveling vehicle body can be lowered and stable travel for the traveling vehicle body is facilitated.

Another non-limiting feature of the vehicle according to the present invention provides a vehicle in which the battery installation space is positioned so as to span an entire width-direction length of the traveling vehicle body between the left and right drive wheels.

According to this feature, the battery can be positioned in the battery installation space which spans the entire length of the traveling vehicle body between the left and right drive wheels. Therefore, even when a battery with a larger capacity is installed, sufficient installation space can be readily reserved.

Another non-limiting feature of the vehicle according to the present invention provides a vehicle in which the output shafts of the left and right propulsion motors are positioned above the axles of the left and right drive wheels, respectively. The vehicle also includes a drive power transmission mechanism between the drive wheel and the propulsion motor in the width direction of the vehicle body, the drive power transmission mechanism transmitting drive power output from the output shaft of the propulsion motor to the axle of the drive wheel.

According to this feature, by positioning the output shafts of the left and right propulsion motors above the axles of the left and right drive wheels, respectively, the battery installation space can be reserved below the left and right propulsion motors with a large space in the vertical direction, as well. Moreover, by placing the output shafts of the propulsion motors and the axles of the drive wheels in different vertical positions, the vertical space created between the output shafts and the axles can be utilized to install the drive power transmission mechanisms. Moreover, an example of the drive power transmission mechanism can include a deceleration mechanism. Thus, appropriate drive power is readily obtained without applying a large load on the propulsion motors when the traveling vehicle body is traveling.

Another non-limiting feature of the vehicle according to the present invention provides a vehicle in which a platform allowing a worker to board and a work device are freely connectable to the traveling vehicle body, being distributed to a front side and a back side of the traveling vehicle body.

According to this feature, the platform and the work device can be connected to the traveling vehicle body in a manner distributed to the front and back sides of the traveling vehicle body. Therefore, the platform and the work device can be provided to the traveling vehicle body with good balance in the front-back direction of the vehicle body and, even when being used as a work vehicle, stable travel is facilitated.

Another non-limiting feature of the vehicle according to the present invention provides a vehicle that includes a propulsion controller controlling the left and right propulsion motors. The left and right propulsion motors are configured to be smaller than the battery installation space in the front-back direction of the vehicle body. The propulsion controller is positioned in a controller installation space designated by, at least, a space overlapping with the battery installation space in a plan view and adjacent to the left and right propulsion motors in the front-back direction of the vehicle body.

According to this feature, the left and right propulsion motors are configured to be smaller than the battery installation space in the front-back direction of the vehicle body. Therefore, a space adjacent to the left and right propulsion motors in the front-back direction of the vehicle body is empty. Thus, by designating the empty space as the controller installation space and positioning the propulsion controller in the controller installation space, the empty space can be effectively utilized to provide the propulsion controller to the traveling vehicle body and the size of the traveling vehicle body can be effectively reduced.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
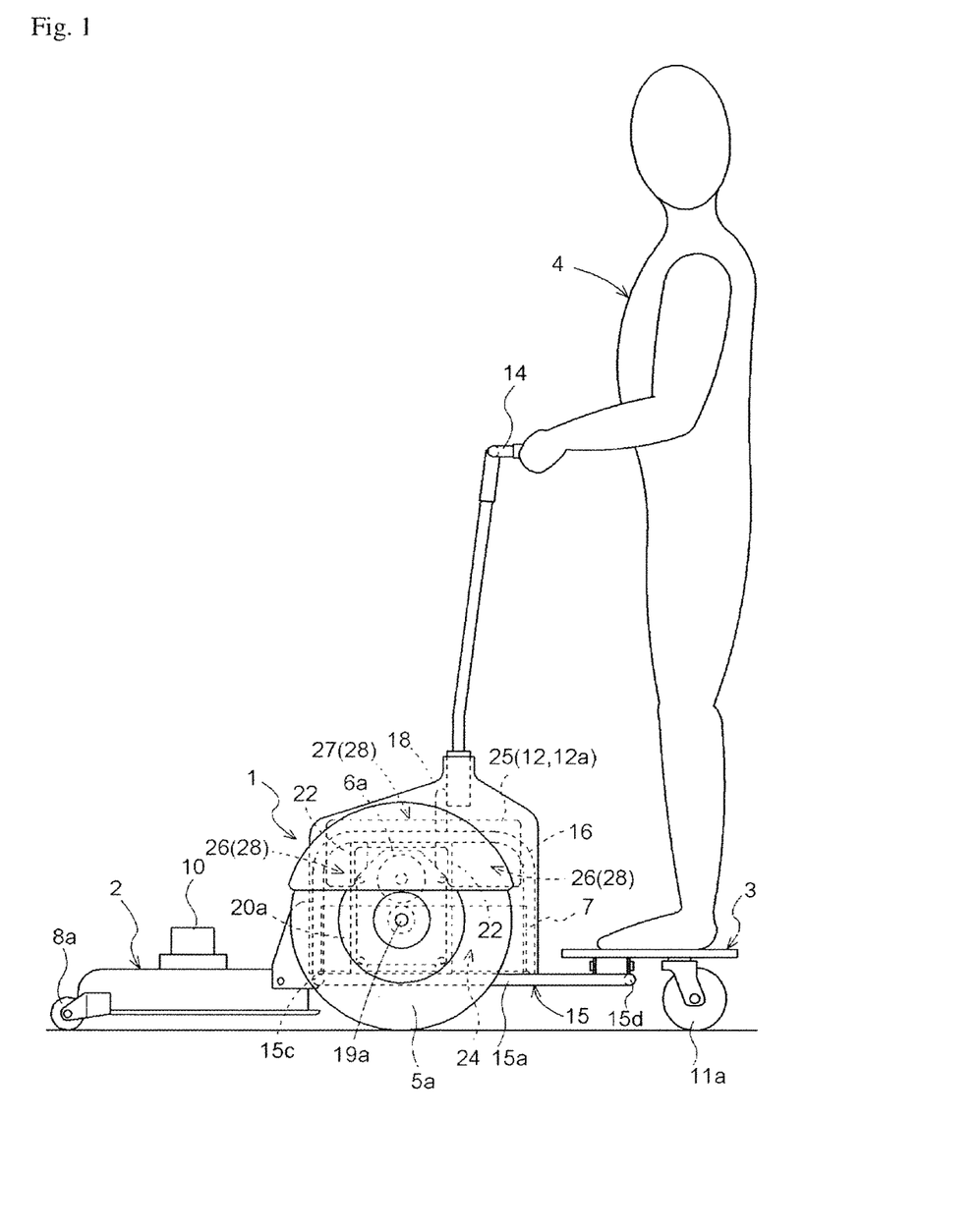
FIG. 1 is a left side view of a work vehicle.
Figure 2:
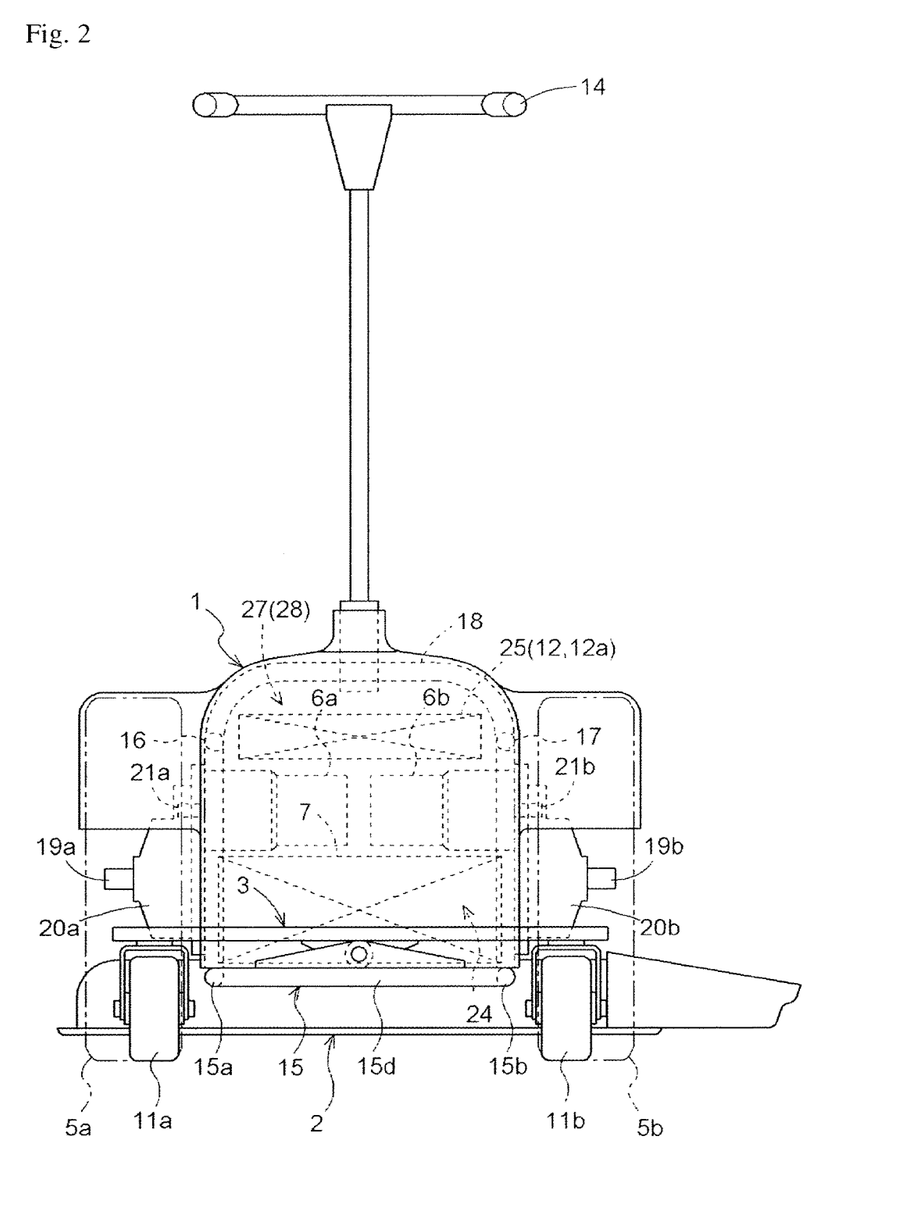
FIG. 2 is a rear view of the work vehicle.

An example is described, with reference to the drawings, in which a work vehicle employing a vehicle according to the present invention is adapted to a lawn mower. As shown in FIGS. 1 and 2, the lawn mower includes a traveling vehicle body 1 supported by left and right drive wheels 5a and 5b; a mower unit 2 connected to a front side of the traveling vehicle body 1; and a platform 3 connected to a back side of the traveling vehicle body 1. In the present embodiment, the mower unit 2 corresponds to a work device, and the platform 3 is configured to allow a worker 4 to board. In this way, the mower unit 2 and the platform 3 are freely connectable to the traveling vehicle body 1, being distributed to the front side and the back side of the traveling vehicle body 1.

The lawn mower is configured as an electromotive drive-type mower. The traveling vehicle body 1 includes left and right propulsion motors 6a and 6b driving the drive wheels 5a and 5b; a battery 7 supplying electric power to the left and right propulsion motors 6a and 6b; and a controller 12 that includes a propulsion controller 12a controlling the left and right propulsion motors 6a and 6b.

Figure 3:
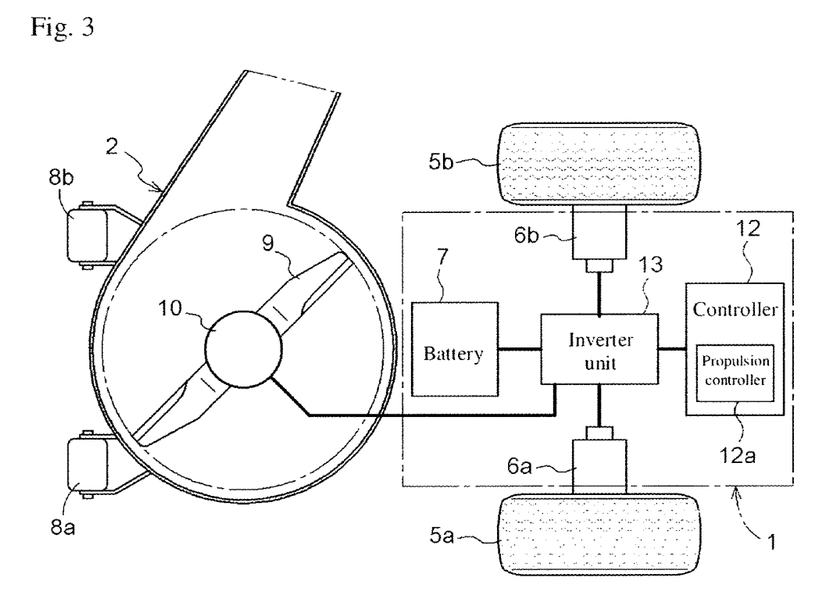
FIG. 3 illustrates a power supply configuration and a control configuration of the work vehicle.
Figure 4:
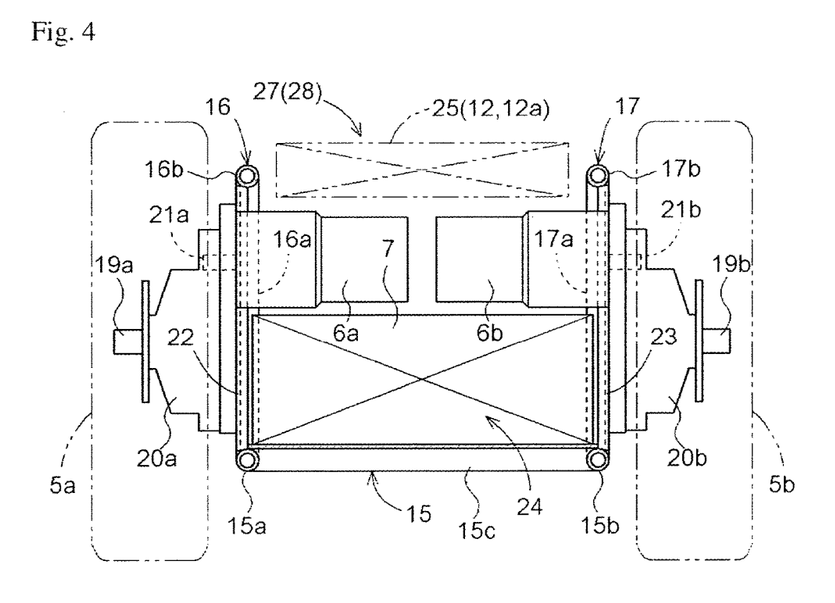
FIG. 4 is a longitudinal cross-sectional view of a front-back direction of a traveling vehicle body, showing relevant portions of the traveling vehicle body.

The mower unit 2 includes left and right gauge wheels 8a and 8b on the front side thereof. The left and right gauge wheels 8a and 8b are positioned so as to be distanced from each other in a width direction of the vehicle body, and are configured by freely casting caster wheels. As shown in FIG. 3, the mower unit 2 includes a blade 9 and a blade motor 10 rotationally driving the blade 9. The mower unit 2 is configured as an electromotive drive-type mower, and is also configured such that, by supplying electric power from the battery 7 to the blade motor 10, the blade motor 10 rotationally drives the blade 9. Although FIG. 3 shows the battery 7 in a front location, this is not to be construed as its required position relative to the controller or the body, but to merely show how it can be connected electrically The platform 3 is formed in a plank shape that enables the worker 4 to board an upper surface thereof in a standing position. The platform 3 includes left and right rear wheels 11a and 11b on the back side thereof. The left and right rear wheels 11a and 11b are positioned so as to be distanced from each other in the width direction of the vehicle body, and are configured by freely casting caster wheels. The platform 3 is connected to the traveling vehicle body 1 in a manner capable of oscillating around a center of an axis that lies along a front-back direction of the vehicle body.

(Configuration of Power Supply and Controls)

As shown in FIG. 3, a power supply to the left and right propulsion motors 6a and 6b and to the blade motor 10 is configured to be supplied via an inverter unit 13, which operates based on control by the controller 12 (ECU). In addition to the propulsion controller 12a controlling the left and right propulsion motors 6a and 6b, the controller 12 also includes various controllers omitted from the drawings, such as a work controller controlling the blade motor 10 and an integrated controller handling operations of the propulsion controller 12a and the work controller.

The left and right propulsion motors 6a and 6b are configured to each be independently operable by, respectively, the propulsion motor 6a on the left side, with respect to the front side of the vehicle body, rotationally driving the left drive wheel 5a and the propulsion motor 6b on the right side, with respect to the front side of the vehicle body, rotationally driving the right drive wheel 5b. Thus, the propulsion controller 12a is not only able to make a rotation direction and a rotation speed of the left drive wheel 5a and the right drive wheel 5b identical but also to differ the rotation direction and rotation speed of the left and right drive wheels 5a and 5b. The propulsion controller 12a is also capable of both a first turning maneuver, in which the left drive wheel 5a and the right drive wheel 5b have different rotation speeds, and a second turning maneuver, in which the left drive wheel 5a and the right drive wheel 5b rotate in opposite directions, in addition to forward and backward travel.

The traveling vehicle body 1 includes a pole-shaped grip member 14 at a position grippable by the worker 4 while aboard the platform 3 and is, for example, configured such that the traveling vehicle body 1 travels forward, backward, and in turning maneuvers due to the worker 4 operating the grip member 14. In the present embodiment, the grip member 14 is formed into a "Y" shape having a lower portion extending vertically from the traveling vehicle body 1 and a forked upper portion splitting to the left and right from a top end of the lower portion. The grip member 14 is supported on the traveling vehicle body 1 so as to be capable of front-back oscillation and of rotation centered around an axis of the lower portion of the grip member 14. The propulsion controller 12a is configured to induce forward travel, backward travel, and turning maneuvers by controlling operation of the left and right propulsion motors 6a and 6b based on detection information from a sensor that detects a front-back oscillation position and a rotation position of the grip member 14. For example, the propulsion controller 12a induces forward travel when the grip member 14 is swung forward without being rotated; induces backward travel when the grip member 14 is swung backward without being rotated; and induces a turning maneuver when the grip member 14 is rotated. Switching between the first turning maneuver and the second turning maneuver is enabled by, for example, the worker 4 operating an operation portion (not shown in the drawings) provided on the grip member 14.

The worker 4 operating the grip member 14 is not the sole basis for performing one of the forward travel, backward travel, and turning maneuvers. For example, a center of gravity of the worker 4 when aboard the platform 3 may be detected and switching between the forward travel, backward travel, and turning maneuvers can be performed according to whether the center of gravity is located in a forward region, a rearward region, a right-side region, and a left-side region. A joystick operable in the front-back and left-right directions may also be provided at a position enabling operation by the worker 4 when aboard the platform 3. By operating the joystick, the worker 4 may perform any of forward travel, backward travel, and turning maneuvers.

The work controller can rotationally drive the blade 9 with the blade motor 10 and cause the mower unit 2 to operate due to the worker 4 operating the operation portion (not shown in the drawings) provided to the grip member 14.

(Configuration of Traveling Vehicle Body)

The traveling vehicle body 1 is configured with a frame shape having a plurality of connected pole-shaped frames including a first frame 15, a second frame 16, a third frame 17, and a fourth frame 18, as shown in FIGS. 1, 2, 4, and 5. A lower frame body of the traveling vehicle body 1 is configured with the first frame 15, a left frame body of the traveling vehicle body 1 is configured with the second frame 16, and a right frame body of the traveling vehicle body 1 is configured with the third frame 17.

The first frame 15 has a rectangular shape in a plan view and includes a left portion 15a, a right portion 15b, a forward portion 15c, and a rearward portion 15d. The left portion 15a and the right portion 15b are positioned so as to be distanced from each other in the width direction of the vehicle body and are configured to extend in the front-back direction of the vehicle body. The forward portion 15c is configured to extend in the width direction of the vehicle body and to connect front ends of the left portion 15a and the right portion 15b to each other. The rearward portion 15d is configured to extend in the width direction of the vehicle body and to connect back ends of the left portion 15a and the right portion 15b to each other. The connection between the mower 2 and the body 1 is advantageously an articulating connection which allows the mower 2 to conform to an irregular grass surface when mowing. The connection between the body 1 and the platform 3 is a left and right pivoting connection which allows the operator 4 to remain upright while the body 1 pivots to the left or right during mowing on an irregular grass surface.

The second frame 16 has an arched shape in a side view, such that the second frame 16 connects a forward portion and a rearward portion of the left portion 15a on the first frame 15. The second frame 16 includes, beginning on a front side, a first extending portion 16a extending in the vertical direction from a lower side toward an upper side; a second extending portion 16b curving from a top end of the first extending portion 16a and extending in the front-back direction of the vehicle body from the front side toward the back side; and a third extending portion 16c curving from a back end of the second extending portion 16b and extending in the vertical direction from the upper side toward the lower side.

The third frame 17 has a configuration similar to that of the second frame 16 except for differences between the left and right sides. The third frame 17 has an arched shape in a side view, such that the third frame 17 connects a forward portion and a rearward portion of the right portion 15b on the first frame 15. The third frame 17 includes, beginning on a front side, a fourth extending portion 17a extending in the vertical direction from a lower side toward an upper side; a fifth extending portion 17b curving from a top end of the fourth extending portion 17a and extending in the front-back direction of the vehicle body from the front side toward the back side; and a sixth extending portion 17c curving from a back end of the fifth extending portion 17b and extending in the vertical direction from the upper side toward the lower side.

On the front side, the connection of the first frame 15, the second frame 16, and the third frame 17 connects the first extending portion 16a on the second frame 16 to the front end of the left portion 15a on the first frame 15, while connecting the fourth extending portion 17a on the third frame 17 to the front end of the right portion 15b on the first frame 15. In contrast, on the back side, the third extending portion 16c on the second frame 16 is connected a defined distance forward of the back end of the left portion 15a on the first frame 15, while the sixth extending portion 17c on the third frame 17 is connected a defined distance forward of the rear end of the right portion 15b on the first frame 15. Thereby, on the first frame 15, a portion of the rearward portion of the left portion 15a, a portion of the rearward portion of the right portion 15b, and the rearward portion 15d are configured so as to project further rearward than the second frame 16 and the third frame 17. A rearward-projecting portion of the first frame 15 is positioned so as to overlap with the platform 3 in the vertical direction. The platform 3 is carried and supported by the projecting portion, thereby enabling the platform 3 to be stably supported.

The fourth frame 18 has an arched shape in a vehicle body front-back direction view, such that a middle portion of the second extending portion 16b on the second frame 16 and a middle portion of the fifth extending portion 17b on the third frame 17 are connected. In this way, by connecting the second frame 16 and the third frame 17 with the fourth frame 18, a degree of strength for the traveling vehicle body 1 is enhanced.

The left and right drive wheels 5a and 5b are positioned on two vehicle width-direction end portions of the traveling vehicle body 1, while the left and right propulsion motors 6a and 6b are positioned on the traveling vehicle body 1 so as to align with the left and right drive wheels 5a and 5b in the vehicle body width direction. Drive power transmission mechanisms 20a and 20b are provided on both the right side and the left side, respectively, in the width direction of the vehicle body between the drive wheels 5a and 5b and the propulsion motors 6a and 6b. The drive power transmission mechanisms 20a and 20b transmit drive power output from output shafts 21a and 21b of the propulsion motors 6a and 6b to axles 19a and 19b of the drive wheels 5a and 5b, respectively. The drive power transmission mechanisms 20a and 20b are, for example, configured by a gear-type deceleration mechanism. The drive power transmission mechanisms 20a and 20b are configured such that the drive power output from the output shafts 21a and 21b of the propulsion motors 6a and 6b, respectively, is transmitted to the axles 19a and 19b of the drive wheels 5a and 5b, respectively, at a reduced speed. Thus, groups of aligned components that include, in order from width-direction exterior sides of the vehicle body in a plan view, the drive wheel 5a/5b, the drive power transmission mechanism 20a/20b, and the propulsion motor 6a/6b, respectively, form one grouping. This grouping is then positioned on the left and right sides of the traveling vehicle body 1 so as to form a left-right pair. Specifically, positioned on the left side in the vehicle body width direction in a plan view, one grouping of components aligns, in order from the exterior side, the left drive wheel 5a, the left drive power transmission mechanism 20a, and the left propulsion motor 6a and, positioned on the right side in the vehicle body width direction, one grouping of components aligns, in order from the exterior side, the right drive wheel 5b, the right drive power transmission mechanism 20b, and the right propulsion motor 6b.

The traveling vehicle body 1 thus includes two groupings of components forming a left-right pair. Therefore, the axle 19a of the left drive wheel 5a and the axle 19b of the right drive wheel 5b are located at a left-right pair of positions with reference to a width-direction center portion of the traveling vehicle body 1, and are located at identical positions in the front-back direction of the vehicle body and in the vertical direction. In addition, the output shaft 21a of the left propulsion motor 6a and the output shaft 21b of the right propulsion motor 6b are located at a left-right pair of positions with reference to the width-direction center portion of the traveling vehicle body 1, and are located at identical positions in the front-back direction of the vehicle body and in the vertical direction. The output shafts 21a and 21b of the left and right propulsion motors 6a and 6b, respectively, are positioned further upward than the axles 19a and 19b of the left and right drive wheels 5a and 5b, respectively. Thereby, a space sufficient to install the drive power transmission mechanisms 20a and 20b can be readily reserved in the vertical direction between the output shafts 21a and 21b and the axles 19a and 19b. The output shafts 21a and 21b of the left and right propulsion motors 6a and 6b, respectively, and the axles 19a and 19b of the left and right drive wheels 5a and 5b, respectively, are located in the same position in the front-back direction of the vehicle body, and are located in positions further toward the front than the center portion of the traveling vehicle body 1.

Figure 5:
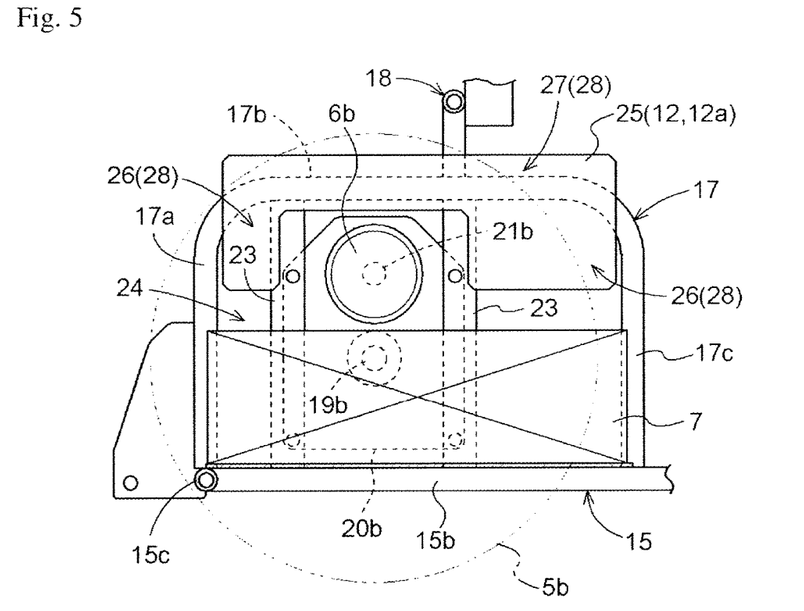
FIG. 5 is a left side longitudinal cross-sectional view of a width direction of the traveling vehicle body, showing relevant portions of the traveling vehicle body.

The left drive power transmission mechanism 20a is provided so as to protrude further outward in the vehicle body width direction than the second frame 16. A first support bracket 22 for supporting the left drive power transmission mechanism 20a spans an entire length in the vertical direction between the left portion 15a on the first frame 15 and the second extending portion 16b on the second frame 16. As shown in FIG. 1, two of the first support brackets 22 are provided so as to be distanced from each other in the front-back direction of the vehicle body, and the left drive power transmission mechanism 20a is fixedly supported between the two first support brackets 22. The right drive power transmission mechanism 20b is also provided so as to protrude further outward in the vehicle body width direction than the third frame 17, in a manner similar to the left drive power transmission mechanism 20a. As shown in FIG. 5, a second support bracket 23 for supporting the right drive power transmission mechanism 20b spans an entire length in the vertical direction between the right portion 15b on the first frame 15 and the fifth extending portion 17b on the third frame 17. Two of the second support brackets 23 are provided so as to be distanced from each other in the front-back direction of the vehicle body, and the right drive power transmission mechanism 20b is fixedly supported between the two second support brackets 23.

The left and right propulsion motors 6a and 6b are integrally provided to the left and right drive power transmission mechanisms 20a and 20b, respectively, and are fixedly supported by the same. A space below the left and right propulsion motors 6a and 6b is designated as a battery installation space 24, and the battery 7 is placed in the battery installation space 24 of the traveling vehicle body 1. At least a portion of the battery installation space 24 is located below the axles 19a and 19b of each of the left and right drive wheels 5a and 5b, respectively, and is located so as to span an entire width-direction length of the traveling vehicle body 1 between the left and right drive wheels 5a and 5b. In the present embodiment, a major portion of the battery installation space 24 is below the axles 19a and 19b of each of the left and right drive wheels 5a and 5b, respectively. In addition to the space below each of the axles 19a and 19b, there is also an upper space vertically adjacent to the lower space, and together the upper space and the lower space from the battery installation space 24. The entire battery installation space 24 can also be located below the axles 19a and 19b of each of the left and right drive wheels 5a and 5b. The battery installation space 24 is positioned so as to span the entire length of the second frame 16 and the third frame 17, as seen in a side view. By positioning the battery installation space 24 in this way, the space below the left and right propulsion motors 6a and 6b can be utilized. In addition, the battery 7 can be positioned so as to span the entire width-direction length of the traveling vehicle body 1 and so as to span the entire length of the second frame 16 and the third frame 17 in the front-back direction of the vehicle body, and thus an adequate installation space can be reserved even when the battery 7 has a large volume.

In the present embodiment, the battery installation space 24 is configured to be longer on the back side than on the front side in the vehicle body front-back direction, centered on an installed position of the output shafts 21a and 21b of the left and right propulsion motors 6a and 6b and the axles 19a and 19b of the left and right drive wheels 5a and 5b, respectively. Thereby, the battery 7 is also positioned so as to be longer on the back side than on the front side in the vehicle body front-back direction, centered on the installed position of the output shafts 21a and 21b of the left and right propulsion motors 6a and 6b and the axles 19a and 19b of the left and right drive wheels 5a and 5b, respectively. A center portion of the battery 7 is thus positioned toward the back.

Although not shown in the drawings, the battery 7 is fixedly supported on the traveling vehicle body 1 by a support bracket spanning the left portion 15a and the right portion 15b of the first frame 15; a support bracket connected to the left portion 15a of the first frame 15; a support bracket connected to the right portion 15b of the first frame 15; and the like. Incidentally, two battery units can be positioned in the battery installation space 24, for example, such that a left battery unit and a right battery unit serve as one battery.

As noted above, the traveling vehicle body 1 includes the left and right propulsion motors 6a and 6b, the left and right drive power transmission mechanisms 20a and 20b, and the battery 7. In addition, the traveling vehicle body 1 also includes a control box 25, which includes the inverter unit 13, the controller 12 having the propulsion controller 12a, and the like. The left and right propulsion motors 6a and 6b are configured to be smaller than the battery installation space 24 in the front-back direction of the vehicle body, and an empty space is formed in a space adjacent to the left and right propulsion motors 6a and 6b in the front-back direction of the vehicle body. Thus, the space overlapping with the battery installation space 24 in a plan view and adjacent to the left and right propulsion motors 6a and 6b in the front-back direction of the vehicle body is designated as a controller installation space 26 where the control box 25, which includes the propulsion controller 12a, is installed.

In the present embodiment, in a side view as shown in FIGS. 1 and 5, the left and right propulsion motors 6a and 6b are positioned toward the center of the battery installation space 24 in the front-back direction of the vehicle body. Therefore, the controller installation space 26 is positioned so as to be on both the front and back sides with respect to the left and right propulsion motors 6a and 6b. In addition, an upper space 27 is also used as an installation space for installing the control box 25, the upper space 27 being adjacent on a top side with respect to the front and back controller installation spaces 26 and the left and right propulsion motors 6a and 6b. Specifically, the controller installation space 26 adjacent to the front side of the left and right propulsion motors 6a and 6b, the controller installation space 26 adjacent to the back side of the left and right propulsion motors 6a and 6b, and the upper space 27 adjacent to the top sides of the front and back controller installation spaces 26 and the left and right propulsion motors 6a and 6b are configured as a control box installation space 28 for installing the control box 25. The control box installation space 28 is configured to have an arched shape around the left and right propulsion motors 6a and 6b.

Although not shown in the drawings, the control box 25 is fixedly supported on the traveling vehicle body 1 by, for example, a support bracket spanning the second frame 16 and the third frame 17. The control box 25 is positioned so as to span an entire length of the traveling vehicle body 1 in the width direction and front-back direction of the vehicle body, and is configured so as to reduce a degree to which the control box 25 protrudes on the top side beyond the second frame 16 and the third frame 17. In addition, the control box 25 can be positioned so as to not protrude on the top side beyond the second frame 16 and the third frame 17.

Figure 6:
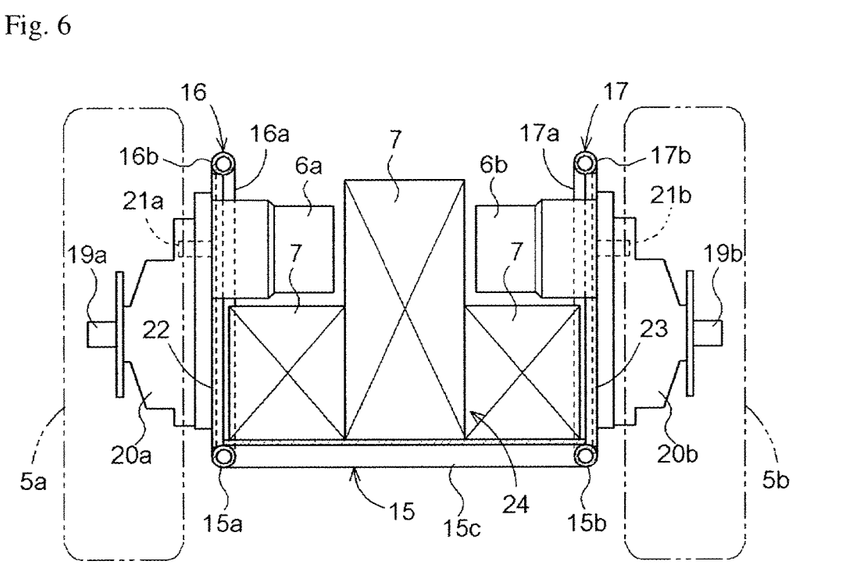
FIG. 6 is a longitudinal cross-sectional view of a front-back direction of a traveling vehicle body, showing relevant portions of the traveling vehicle body according to another embodiment.

Other Embodiments (1) In the above-described embodiment, the battery installation space 24 was located only in the space below the left and right propulsion motors 6a and 6b. However, as shown in FIG. 6, the battery installation space 24 may also be located, for example, between the left and right propulsion motors 6a and 6b in the width direction of the vehicle body. In this case, the battery 7 is a single battery configured with three battery units aligned in the width direction of the vehicle body, where the battery unit positioned at the width-direction center of the vehicle body is larger in the vertical direction than the other battery units. The battery 7 is thus also positioned in a battery installation space 24 that is between the left and right propulsion motors 6a and 6b.

Figure 7:
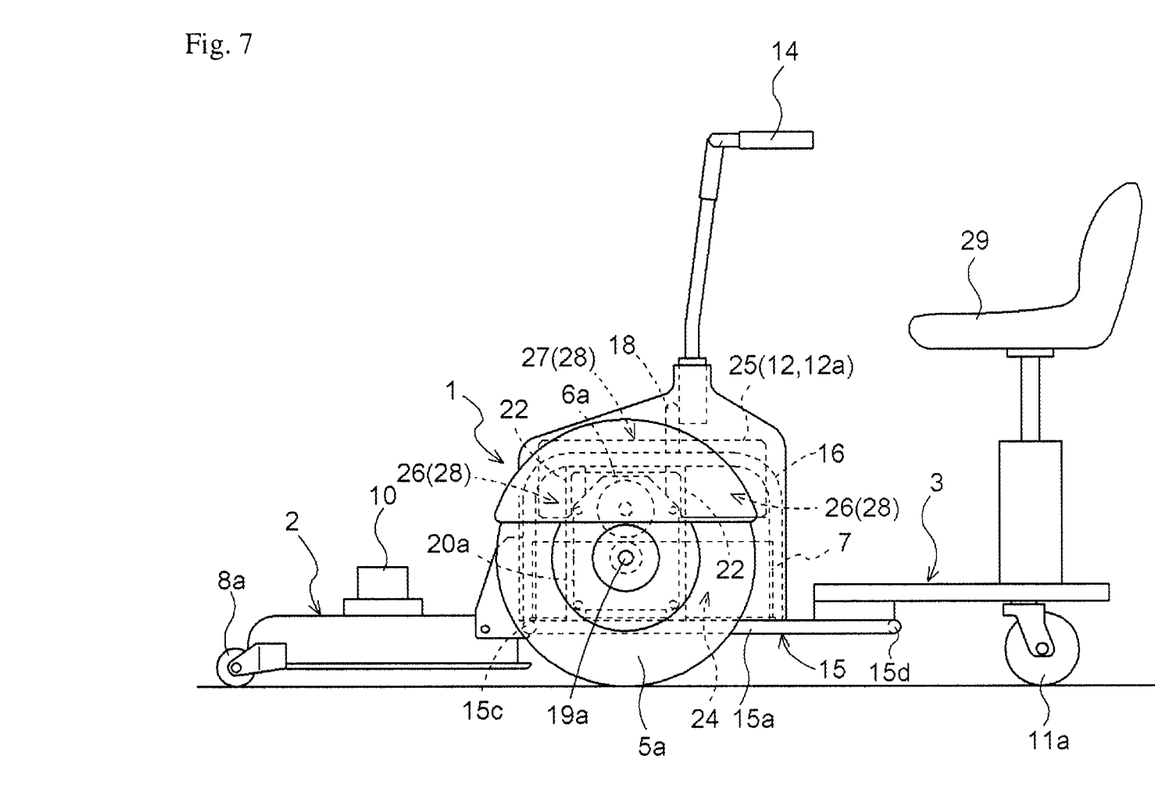
FIG. 7 is a left side view of a work vehicle according to another embodiment.

(2) In the above-described embodiment, the platform 3 is configured such that the worker 4 boards the platform 3 in a standing position. However, as shown in FIG. 7, the platform 3 can also include a seat 29, for example, in which the worker 4 is able to sit.

(3) In the above-described embodiment, the battery installation space 24 is positioned so as to be longer on the back side than on the front side in the front-back direction of the vehicle body, centered on the installed position of the output shafts 21a and 21b of the left and right propulsion motors 6a and 6b and the axles 19a and 19b of the left and right drive wheels 5a and 5b, respectively. In addition, for example, the battery installation space 24 may be positioned so as to have the same length on the front and back sides in the front-back direction of the vehicle body, centered on the installed position of the output shafts 21*a* and 21*b* of the left and right propulsion motors 6*a* and 6*b* and the axles 19*a* and 19*b* of the left and right drive wheels 5*a* and 5*b*, respectively. In addition, the battery installation space 24 may instead be positioned so as to be longer on the front side than on the back side in the front-back direction of the vehicle body, centered on the installed position of the output shafts 21*a* and 21*b* of the left and right propulsion motors 6*a* and 6*b* and the axles 19*a* and 19*b* of the left and right drive wheels 5*a* and 5*b*, respectively.

(4) The above-described embodiment includes the drive power transmission mechanisms 20*a* and 20*b*, which transmit the drive power output from the output shafts 21*a* and 21*b* of the propulsion motors 6*a* and 6*b* to the axles 19*a* and 19*b* of the drive wheels 5*a* and 5*b*, respectively. However, by providing the output shafts 21*a* and 21*b* of the propulsion motors 6*a* and 6*b* so as to be at the same position as the axles 19*a* and 19*b* of the drive wheels 5*a* and 5*b*, the drive power output from the output shafts 21*a* and 21*b* of the propulsion motors 6*a* and 6*b* may, for example, be transmitted directly to the axles 19*a* and 19*b* of the drive wheels 5*a* and 5*b*, respectively, without including the drive power transmission mechanisms 20*a* and 20*b*.

(5) In the above-described embodiment, the mower unit 2 is connected to the front side of the traveling vehicle body 1 and the platform 3 is connected to the back side of the traveling vehicle body 1. However, the mower unit 2 and the platform 3 may also be connected to the traveling vehicle body 1 swapped in the front-back direction. The work device is not limited to the mower unit 2. Various other kinds of work devices may also be adapted to the present invention.

The present invention includes a traveling vehicle body supported by left and right drive wheels, and left and right propulsion motors driving the left and right drive wheels, and may be adapted to various vehicles that are capable of reducing a width-direction and front-back direction size of a traveling vehicle body while providing left and right propulsion motors and a battery to the traveling vehicle body.

Figure 8:
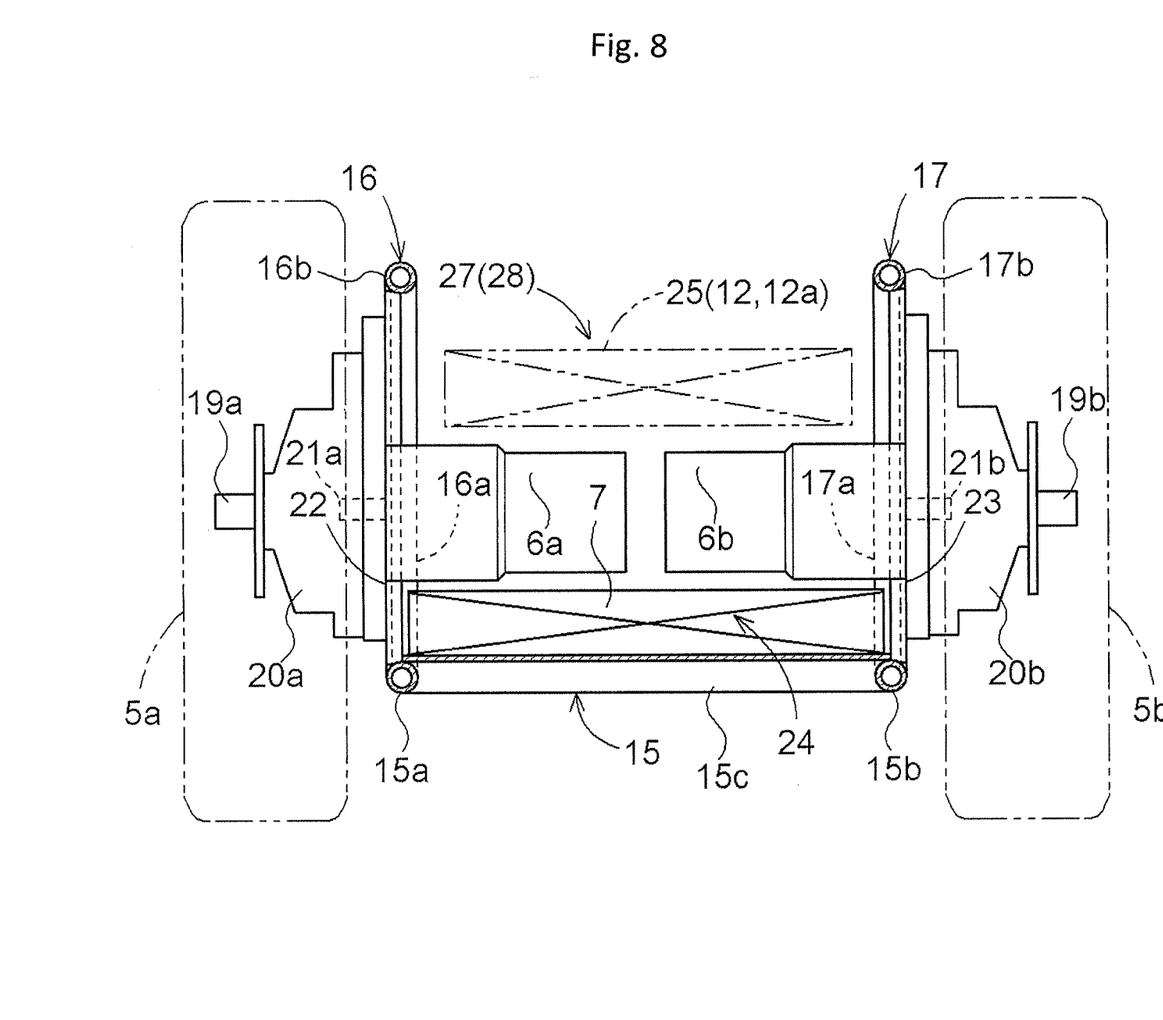
FIG. 8 schematically shows how the left and right motors can be aligned with an axis of the left and right wheels.
Figure 9:
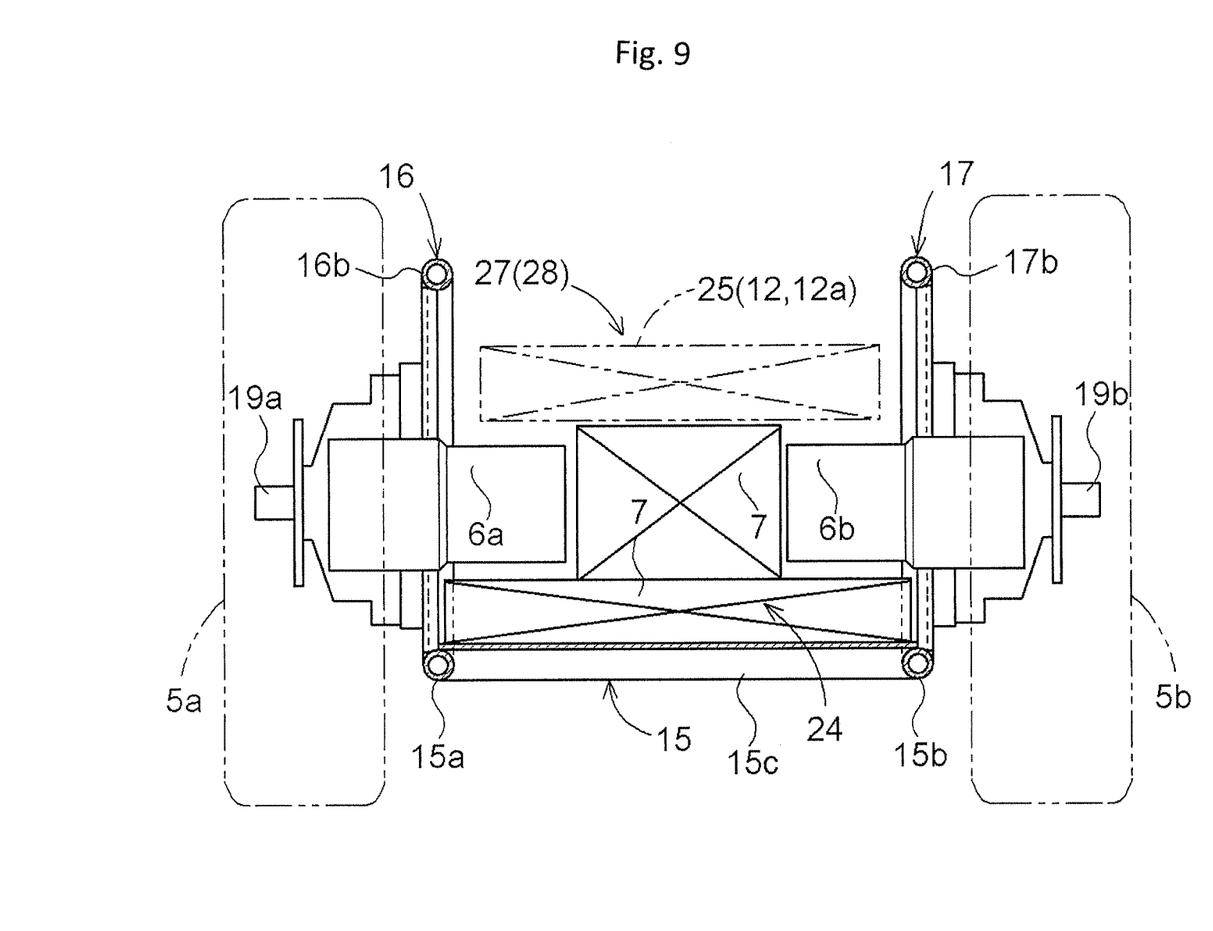
FIG. 9 schematically shows how the left and right motors can be integrated within the left and right wheels and/or otherwise directly drive the same.
Figure 10:
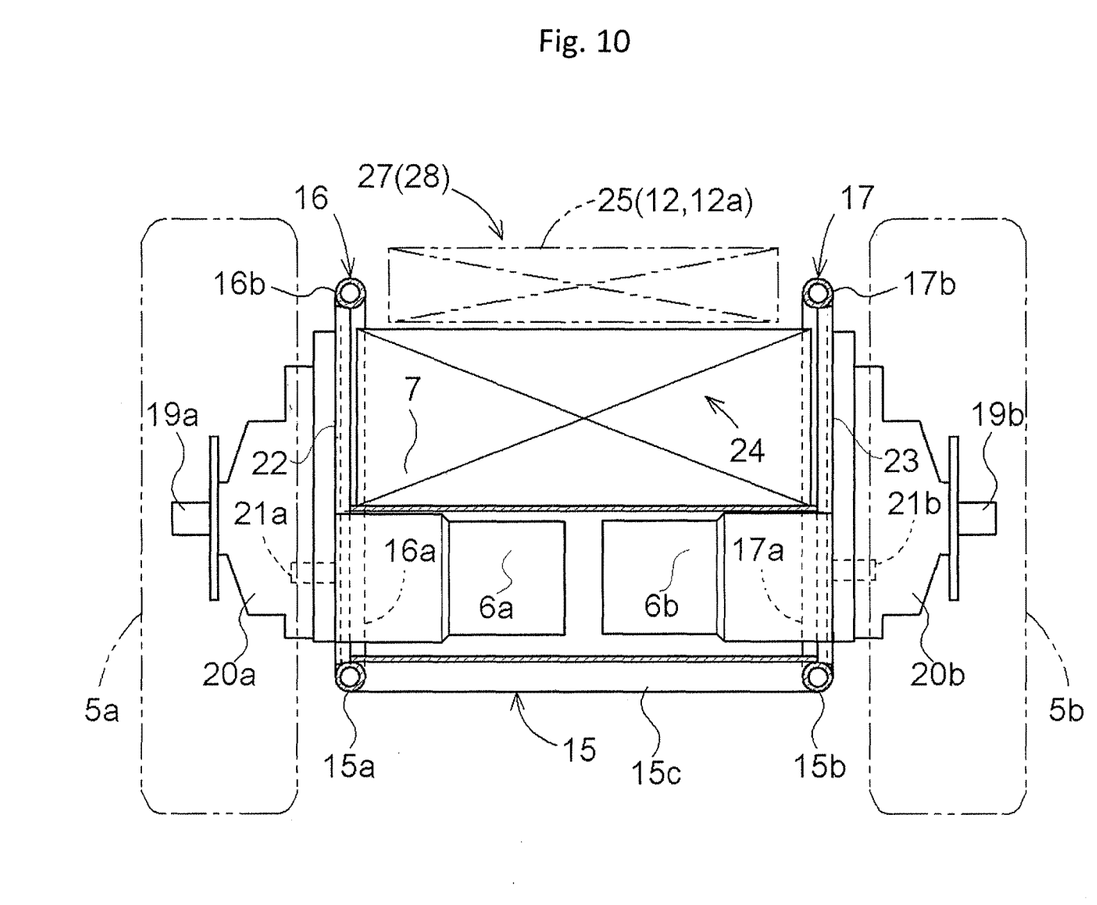
FIG. 10 schematically shows how the battery can be arranged in a position above the axis of the left and right wheels.
Figure 11:
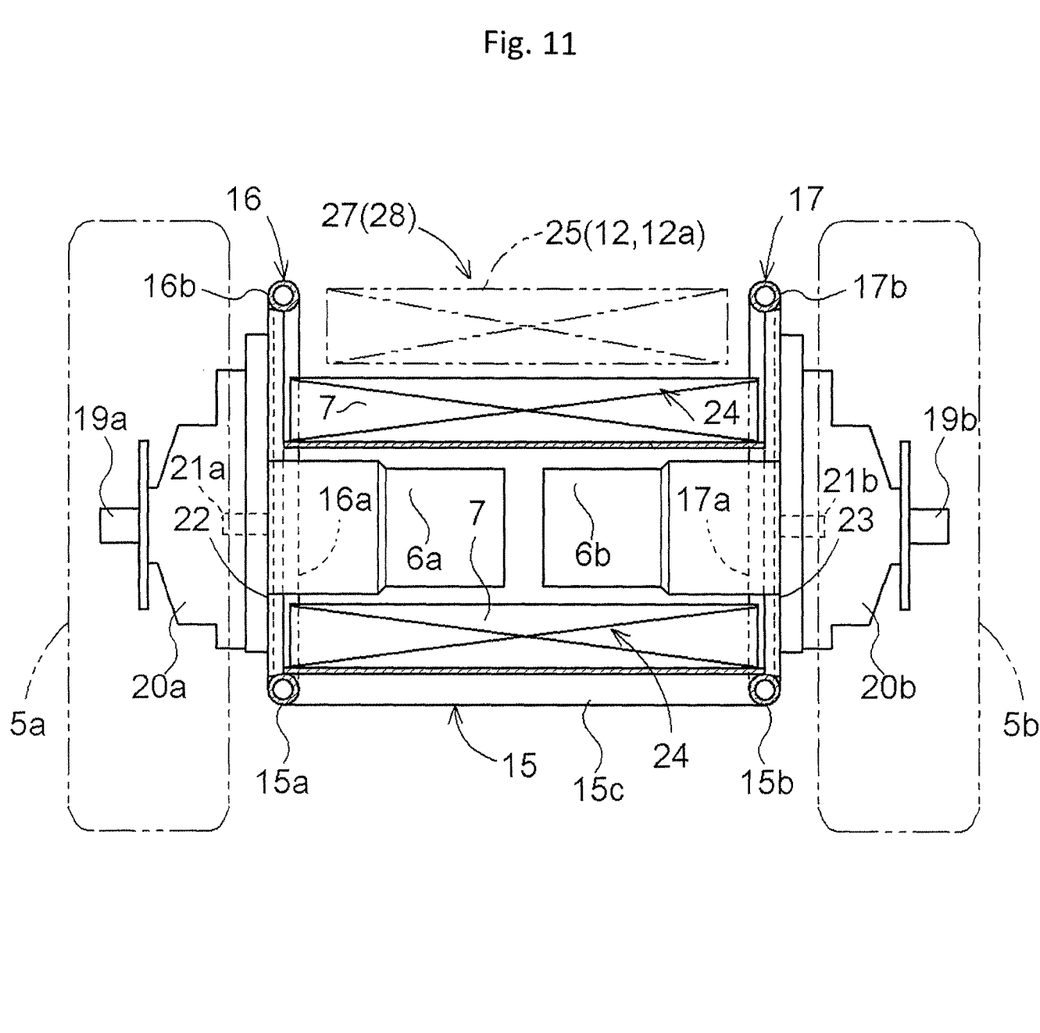
FIG. 11 shows an embodiment where separate batteries are positioned above and below the motors.

The invention also contemplates other variations embodiments such as that shown in FIG. 8 which shows how the left and right motors can be aligned with an axis of the left and right wheels while also being located above the battery. In FIG. 9, there is shown how the left and right motors can be integrated within the left and right wheels or alternatively or additionally be arranged to directly drive the same. Next, FIG. 10 shows how the battery can be arranged in a position above the axis of the left and right wheels while the motors are arranged below the axis of the left and right wheels. Finally, FIG. 11 shows an embodiment where separate batteries 7 are positioned above and below the motors 6*a* and 6*b*.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A vehicle comprising:
   a traveling vehicle body lacking a driver support platform and being supported by left and right drive wheels;
   the left drive wheel being arranged on a left lateral side of the traveling vehicle body;
   the right drive wheel being arranged on a right lateral side of the traveling vehicle body;
   left and right propulsion motors located between the left and right drive wheels and respectively driving the left and right drive wheels;
   the left and right propulsion motors being positioned on the traveling vehicle body such that each of:
      an axis of the left and right drive wheels is axially aligned with an axis of at least one of the left and right propulsion motors;
      an axis of the left and right drive wheels is substantially parallel with an axis of at least one of the left and right propulsion motors;
      at least one of the left and right drive wheels being directly driven by at least one of the left and right propulsion motors; and
      at least one drive housing coupled to each of:
         at least one of the left and right drive wheels; and
         at least one of the left and right propulsion motors;
   at least one battery supplying electric power to the left and right propulsion motors and being positioned in a battery installation space of the traveling vehicle body;
   the battery installation space being located adjacent the left and right propulsion motors;
   an operator grip; and
   a mower unit with wheels movably connected to either a first or second side of the traveling vehicle body; and
   an operator platform with wheels movably coupled to a side opposite from the mower unit.

2. The vehicle according to claim 1, wherein at least a portion of the battery installation space is located below axles of each of the left and right drive wheels.

3. The vehicle according to claim 1, wherein the battery installation space comprises a width that substantially corresponds to a width of the traveling vehicle body defined by the left and right lateral sides.

4. The vehicle according to claim 1, wherein the left and right propulsion motors respectively comprise an output shaft and each output shaft is located above a respective axle of the left and right drive wheels.

5. The vehicle according to claim 1, further comprising at least one drive power transmission mechanism comprising the drive housing and being configured to transfer power between a respective left and right propulsion motor and a respectively left and right drive wheel.

6. The vehicle according to claim 1, further comprising left and right drive power transmission mechanisms configured to transfer power between a respective left and right propulsion motor and a respectively left and right drive wheel.

7. The vehicle according to claim 1, further comprising a propulsion controller controlling the left and right propulsion motors.

8. The vehicle according to claim 1, wherein the left and right propulsion motors are each smaller in size than the battery installation space.

9. The vehicle according to claim 1, further comprising a propulsion controller arranged in a designated controller installation space that is at least one of:
 arranged adjacent the left and right propulsion motors;
 at least partially arranged adjacent to and in front of the left and right propulsion motors;
 at least partially arranged adjacent to and above the left and right propulsion motors;
 at least partially arranged adjacent to and in back of the left and right propulsion motors.

10. The vehicle according to claim 1, further comprising a propulsion controller arranged in a designated generally U-shaped controller installation space.

11. The vehicle according to claim 1, further comprising a propulsion controller arranged in a designated controller installation space that at least partially overlaps with the battery installation space.

12. A vehicle comprising:
 a traveling vehicle body lacking a driver support platform and having arranged on lateral sides thereof left and right drive wheels;
 left and right propulsion motors located between and driving the left and right drive wheels;
 a battery supplying electric power to the left and right propulsion motors and being located in a battery installation space arranged adjacent to the left and right propulsion motors;
 an axis of rotation of the left and right propulsion motors and an axis of rotation of the left and right drive wheels being oriented along a width direction of the traveling vehicle body;
 each of:
  a portion of the battery is disposed above the axis of rotation of the left and right drive wheels; and
  at least one of the left and right propulsion motors is arranged below the axis of rotation of the left and right drive wheels;
 an operator grip allowing a vehicle driver to control movement of to the traveling vehicle body;
 an operator platform with caster wheels movably coupled to a first side of the traveling vehicle body; and
 a mower unit with wheels movably coupled to a second and opposite side of the traveling vehicle body.

13. The vehicle according to claim 1, wherein the battery is oriented vertically.

14. The vehicle according to claim 1, wherein the battery is entirely arranged above the axis of rotation of the left and right drive wheels.

15. A vehicle comprising:
 a traveling vehicle body lacking a driver support platform and having only two wheels;
 said two wheels being left and right drive wheels arranged on lateral sides of the traveling vehicle body and being configured to steer the vehicle via different rotation speeds of the left and right drive wheels;
 left and right propulsion motors located between and respectively driving the left and right drive wheels;
 the left and right propulsion motors each having an axis of rotation that is generally parallel to an axis of the left and right drive wheels;
 at least one battery arranged in a designated battery installation space that is:
  arranged within or on the traveling vehicle body;
  arranged adjacent the left and right propulsion motors; and
  at least partially disposed between left and right drive wheels;
 an operator grip coupled to the traveling vehicle body;
 an operator platform with caster wheels supporting a vehicle driver and being movably coupled to a first side of the traveling vehicle body; and
 a mower unit with wheels movably coupled to a second and opposite side of the traveling vehicle body.

16. The vehicle according to claim 15, wherein the axis of rotation of the left and right propulsion motors is arranged above the axis of rotation of the left and right drive wheels and the designated battery installation space is arranged between a rear side of the traveling vehicle body and each said axis of rotation.

17. The vehicle according to claim 1, wherein the battery installation space is at least partially located below the left and right propulsion motors.

18. The vehicle according to claim 1, wherein the battery installation space is at least partially located above the left and right propulsion motors.

19. The vehicle according to claim 1, wherein:
 the axis of the left and right drive wheels is spaced from and above a support surface of the traveling vehicle body.

20. The vehicle according to claim 12, wherein:
 the axis of the left and right drive wheels passes through a central area of the traveling vehicle body when viewed from above;
 the operator platform wheels comprise ground contacting wheels; and
 the work device wheels comprise ground contacting wheels.

21. The vehicle according to claim 1, wherein the traveling vehicle body utilizes at least one of:
 the left and right drive wheels that provide steering using different rotation speeds;
 the left and right drive wheels having a diameter that is greater than half a height or length of the vehicle body; and
 the left and right drive wheels having an upper end located above the left and right propulsion motors.

22. The vehicle according to claim 12, wherein the traveling vehicle body utilizes:
 the left and right drive wheels that provide steering using different rotation speeds; and
 the left and right drive wheels having an upper end located above the left and right propulsion motors.

23. The vehicle according to claim 15, wherein each of:
 the axis of rotation of left and right propulsion motors are arranged below the axis of rotation of the left and right drive wheels; and
 the designated battery installation space is arranged above the axis of rotation of the left and right drive wheels.

* * * * *